United States Patent [19]
Adams et al.

[11] Patent Number: 5,949,884
[45] Date of Patent: Sep. 7, 1999

[54] DESIGN PRINCIPLES OF THE SHADE CIPHER

[75] Inventors: Carlisle M. Adams, Ottawa; Michael J. Wiener, Nepean, both of Canada

[73] Assignee: Entrust Technologies, Ltd., Ottawa, Canada

[21] Appl. No.: 08/950,416

[22] Filed: Oct. 24, 1997

Related U.S. Application Data

[60] Provisional application No. 60/030,357, Nov. 7, 1996.

[51] Int. Cl.$^6$ ...................................................... H04K 1/00
[52] U.S. Cl. ................................................ 380/29; 380/37
[58] Field of Search .................................. 380/23, 25, 29, 380/37, 49

[56] References Cited

U.S. PATENT DOCUMENTS

| | | |
|---|---|---|
| 5,054,067 | 10/1991 | Moroney et al. . |
| 5,511,123 | 4/1996 | Adams . |
| 5,606,616 | 2/1997 | Sprunk et al. ............................. 380/29 |
| 5,608,801 | 3/1997 | Aiello et al. . |
| 5,664,016 | 9/1997 | Preneel et al. . |
| 5,673,318 | 9/1997 | Bellare et al. ............................. 380/23 |

OTHER PUBLICATIONS

E. Biham, *How to Forge DES–Encrypted Messages in $2^{28}$ Steps*, Technical Report CS 884, Department of Computer Science, Technion, Haifa, Israel, Aug., 1996 (also available at http://www.cs.technion.ac.il/~biham/publications.html).

M. Luby and C. Rackoff, *How to Construct Pseudorandom Permutations From Pseudorandom Functions*, SIAM Journal of Computing, vol. 17 #2, Apr., 1988, pp. 373–386.

U. Maurer, *A Simplified and Generalized Treatment of Luby–Rackoff Pseudorandom Permutation Generators*, in Advances in Cryptology: Proceedings of Eurocrypt 92, Springer, 1993, pp. 239–255.

*Primary Examiner*—David Cain
*Attorney, Agent, or Firm*—Markison & Reckamp, P.C.

[57] ABSTRACT

A method of encrypting or decrypting an input message block of binary data of predetermined length 2n into an output message block by dividing the message block into two equal size halves, performing one or more transformation rounds on the message block halves, each transformation round further comprising the steps of determining a key, processing the first half data block using a hash function to obtain a modified first half data block of length n, and combining the modified first half data block with the second half data block to obtain a modified second half data block of length n; and, lastly, appending the first modified half data block to the second modified half data block to obtain the output message block.

38 Claims, 7 Drawing Sheets

FEISTEL NETWORK

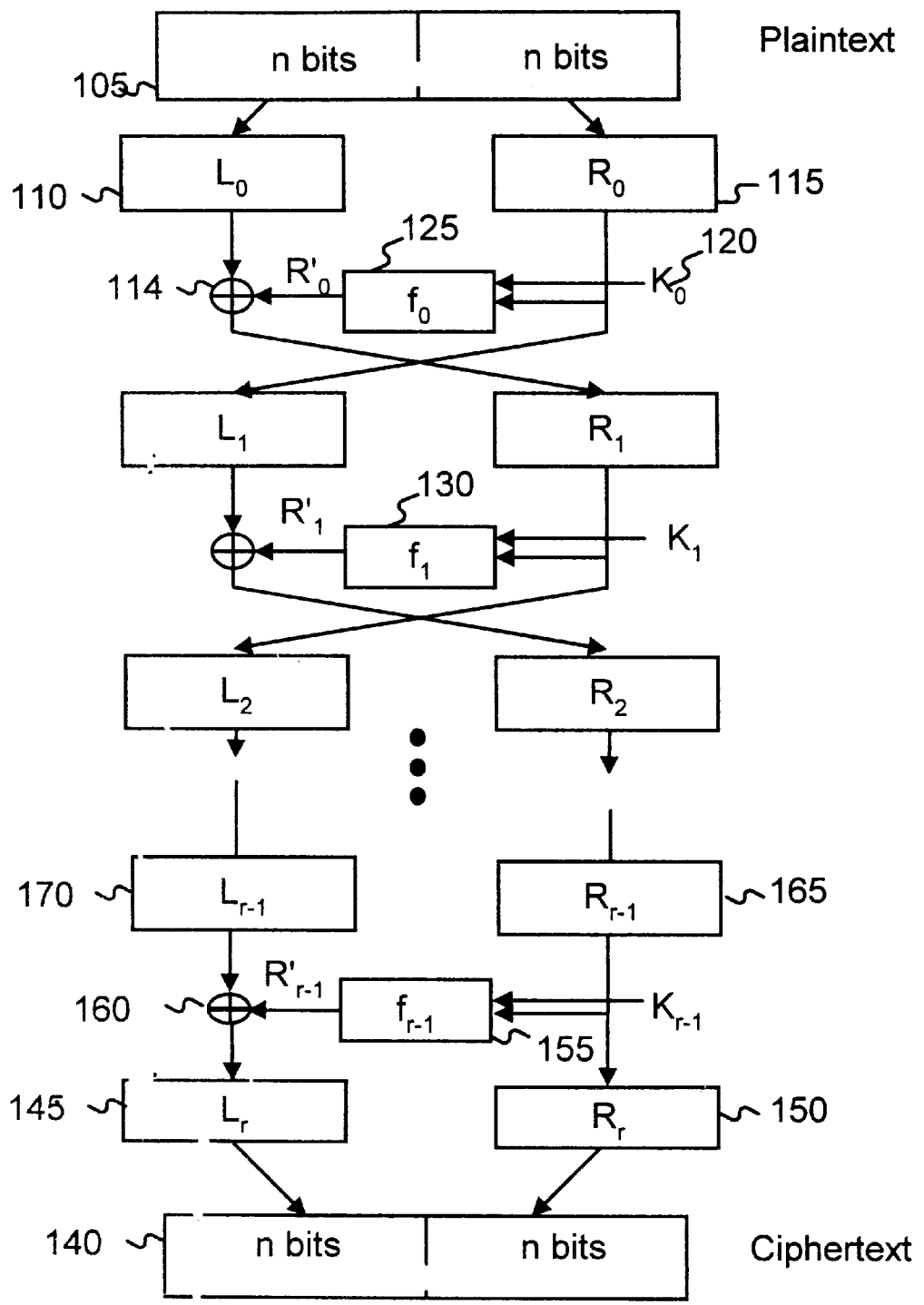
FIGURE 1a: Prior Art

ROUND FUNCTION: STEP TWO

DESIGN PRINCIPLES OF THE SHADE CIPHER

CROSS-REFERENCE TO RELATED APPLICATIONS

This application claims the benefit of U.S. Provisional Application No. 60/030,357, filed Nov. 7, 1996.

BACKGROUND OF THE INVENTION

The present invention relates generally to cryptographic methods and systems to be used in digital data processing, and in particular, is directed to cryptographic methods and systems using block ciphers employing balanced Feistel networks with hash functions as round functions.

There are two categories of symmetric key-based cryptographic algorithms. Stream ciphers convert plaintext to ciphertext one bit (or byte) at a time. Block ciphers operate on groups of bits called "blocks." A block cipher that mixes layers of substitution and permutation is called a Substitution-Permutation Network (SPN). SPNs are alternating layers of nonlinear substitution boxes (s-boxes) and linear permutations which serve to scramble the bits of the plaintext in a key-dependent way to create the ciphertext. An s-box layer and a permutation layer together are often referred to as a single "round."

The input to the cipher is a block of plaintext 2n bits in length. There are two general classes of SPNs: those that operate on the full 2n bits of data in each round; and those that operate on fewer than 2n bits (i.e., partial blocks) and then swap the partial blocks between rounds. The second class is what is typically meant in the cryptographic literature by the terms "Feistel cipher" and "Feistel network." The DES (U.S. Data Encryption Standard) was constructed using this approach.

The general structure of an r-round Feistel network is shown in FIG. 1$a$. Basic encryption operation is as follows. A plaintext message block 105 of 2n bits is input and split into a left half $L_0$ 110 and a right half $R_0$ 115. If the message block is divided into two equal blocks of length n, the Feistel network is said to be "balanced." Right half $R_0$ 115, and key $K_0$ 120 are input to round function $f_0$ 125, the output of which is used to modify left half $L_0$ 110. In FIG. 1$a$, $L_0$ 110 is modified using XOR addition at 114. The result becomes $R_1$ and is used as the next input to function $f_1$ at 130; $R_0$ 115 then becomes $L_1$. Swapping the left and right halves completes round one. This process continues for as many rounds as the cipher requires. After the final round, which does not contain a swap in order to simplify implementation of the decryption process, the left and right halves are concatenated to form ciphertext 140.

In symmetric cryptographic algorithms based on Feistel networks, the same process works for both encryption and decryption with minimal modifications. The decryption process is essentially the encryption process in reverse order. Referring again to FIG. 1$a$, in the decryption process, ciphertext message block 140 of 2n bits would be split into a left half $L_r$ 145 and a right half $R_r$ 150. Right half $R_r$ 150, and key $K_{r-1}$ 165 are input to round function $f_{r-1}$ 155, the output of which is used to modify left half $L_r$ 170. $L_r$ 145 is modified using XOR addition at 160. The result becomes $R_{r-1}$ and is used as the next input to function $f_{r-2}$; $R_r$ then becomes $L_{r-1}$. Swapping the left and right halves completes round one. To complete the decryption process, the final left and right halves are concatenated to form plaintext 105.

The security of block ciphers based on Feistel networks is directly related to the ability of the round function to resist cryptanalytic attack. In their 1988 paper, "How to Construct Pseudorandom Permutations From Pseudorandom Functions," *SIAM Journal of Computing*, Vol. 17, No. 2 (April 1988), M. Luby and C. Rackoff showed that provably secure three- or four-round Feistel networks can be constructed using secure pseudorandom functions as the component round functions. They were able to show that three-round networks provide security against chosen plaintext attacks provided that no more than k plaintext blocks are encrypted and assuming the adversary does not have unlimited computing power with which to perform exhaustive key search for keys of reasonable length. Furthermore, four-round Feistel networks, sometimes called super pseudorandom invertible permutations, are secure against chosen ciphertext attacks under the same conditions. Such attacks are among the strongest known against any cryptosystem, so efficient ciphers which are secure against these attacks would be of immediate value in a number of environments.

Some researchers have replaced secure, but inefficient, pseudorandom functions with known hash functions such as MD5, SHA-1, or RIPE-MD. While these ciphers are faster to execute, they are no longer provably secure, since no hash function has yet been proven to be a pseudorandom function. These ciphers also tend to be "unbalanced" Feistel networks (in which the plaintext is split into two pieces of size) and may incorporate other primitive techniques, such as a steam cipher, to deal with the unbalance. This can complicate the analysis of such ciphers so that it is even more difficult to gain confidence in their security.

Using a smaller Luby-Rackoff cipher as the round function in a recursive design also has been suggested. For example, a 4n bit to 4n bit Luby-Rackoff cipher uses 2n-bit to 2n-bit Luby-Rackoff ciphers as its round functions, each of which uses n-bit to n-bit Luby Rackoff ciphers for its round functions, and so on. Researchers have shown, however, that a cipher of this design can be used to encrypt only a handful of plaintexts before security is threatened. See U. Maurer, "A Simplified and Generalized Treatment of Luby-Rackoff Pseudorandom Permutation Generators," in *Advances in Cryptography: Proceedings of Eurocrypt 92*, Springer (1993), pp. 189–203.

Furthermore, research has shown that the theoretical security of any block cipher is at most the square root of the size of the keyspace (due to so-called key-collision attacks), so that for true 128-bit security, 256-bit keys must be used. See E. Biham, "How to Forge DES-Encrypted Messages in $2^{28}$ steps," Technical Report CS 884, Dept. of Computer Science, Technion, Haifa, Israel, August 1996. Ciphers with large block sizes may be used with a large number of plaintexts (up to the square root of the block size), so that ciphers with larger block sizes may be appropriate even for environments in which many terabytes of data must be encrypted with a single key.

It is therefore desirable to develop a cipher that has the simplicity of the balanced Feistel network plus the efficiency of hash functions.

It is also desirable to construct Feistel network-based ciphers that rest on the theoretical underpinnings of Luby and Rackoff.

It is further desirable to create a function which retains the apparent pseudorandom properties of MD5 and SHA-1, but which is more suitable for a fixed-size, symmetric block cipher.

It is also desirable to develop a cipher that even with large key sizes is computationally fast to implement.

Additionally, it is desirable that the key scheduling process not be prohibitively long compared with, for example, the encryption or decryption of a single block of plaintext.

SUMMARY OF THE INVENTION

To meet these desires, a method consistent with this invention begins with a balanced Feistel network using a modified hash function as the round function. The function accepts two fixed-size inputs, each of which is the size of the function output. This new cipher blends the well-studied security of balanced Feistel networks with the increased performance of hash functions.

More specifically, a method consistent with the present invention of transforming an input message block of binary data of predetermined length 2n bits into an output message block, where n is a positive integer, comprises the steps of dividing the message block into a first and a second half data block of equal length; processing the message block by one or more transformation rounds, each transformation round further comprising the steps of determining a set of keys processing the first half data block and a key using a hash function to obtain a modified first half data block of length n, and combining the modified first half data block with the second half data block to obtain a modified second half data block of length n; and appending the first modified half data block to the second modified half data block to obtain an output message block.

According to another aspect of the invention, a data encryption system for transforming an input message block of binary data of predetermined length 2n into an output message block, where n is a positive integer, comprises a divider for dividing the message block into a first and a second half data block of equal length; a key generator; a hashing processor for processing the first half data block and a key using a hash function to obtain a modified first half data block of length n; a data processor for combining the modified first half data block with the second half data block to obtain a modified second half data block of length n; and a concatenator for appending the first modified half data block to the second modified half data block to obtain an output message block.

BRIEF DESCRIPTION OF THE DRAWINGS

The accompanying drawings, which are incorporated in and constitute a part of this specification, illustrate the invention and, together with the description, serve to explain the principles of the invention.

FIG. 1a is a diagram of a Feistel cipher;

DESCRIPTION OF THE PREFERRED EMBODIMENTS

Reference will now be made in detail to preferred implementations consistent with the present invention, an example of which is illustrated in the accompanying drawings.

Figure 1B:
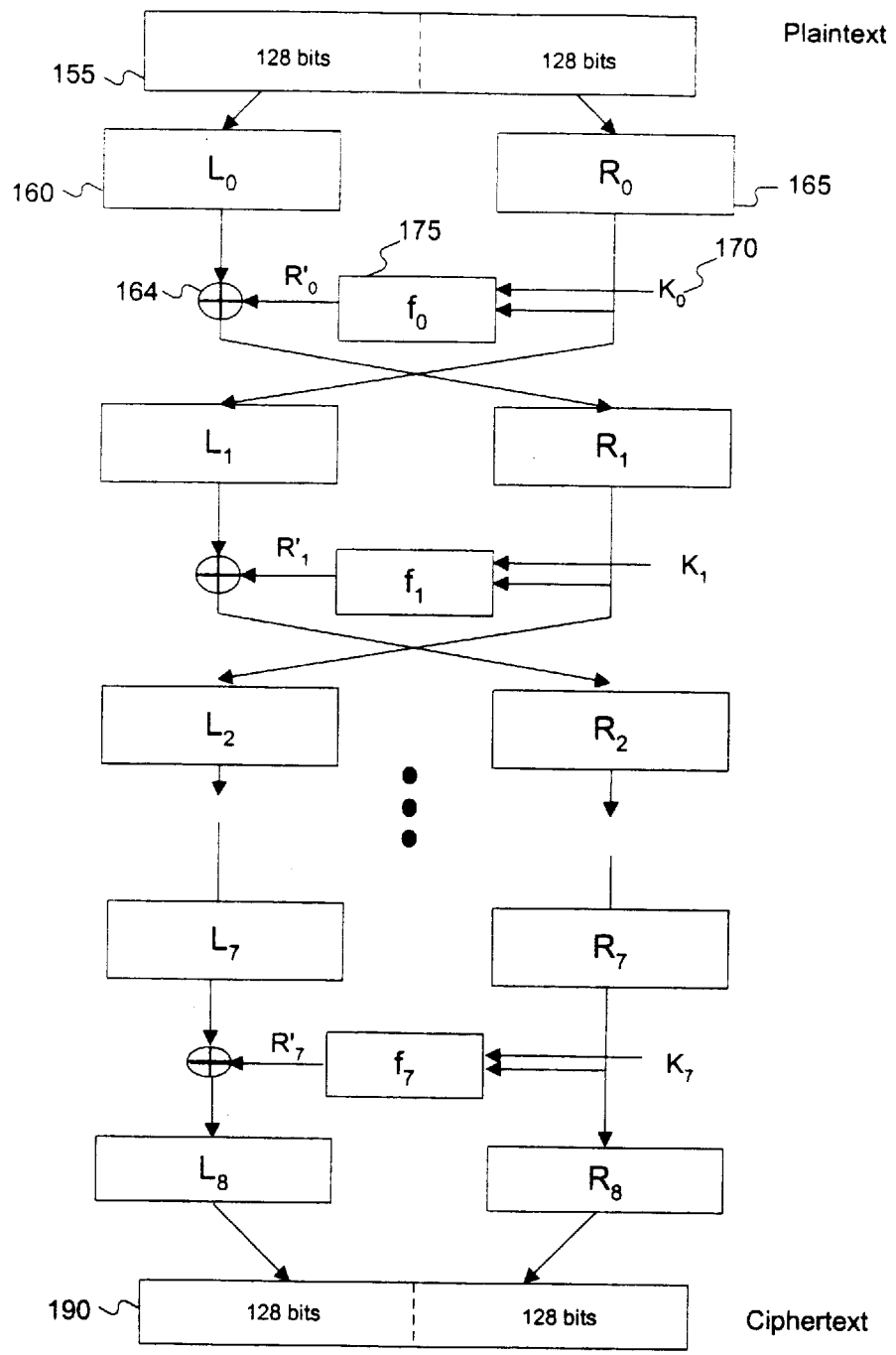
FIG. 1b is a diagram of the Feistel network-like structure of the present invention.
Figure 2:
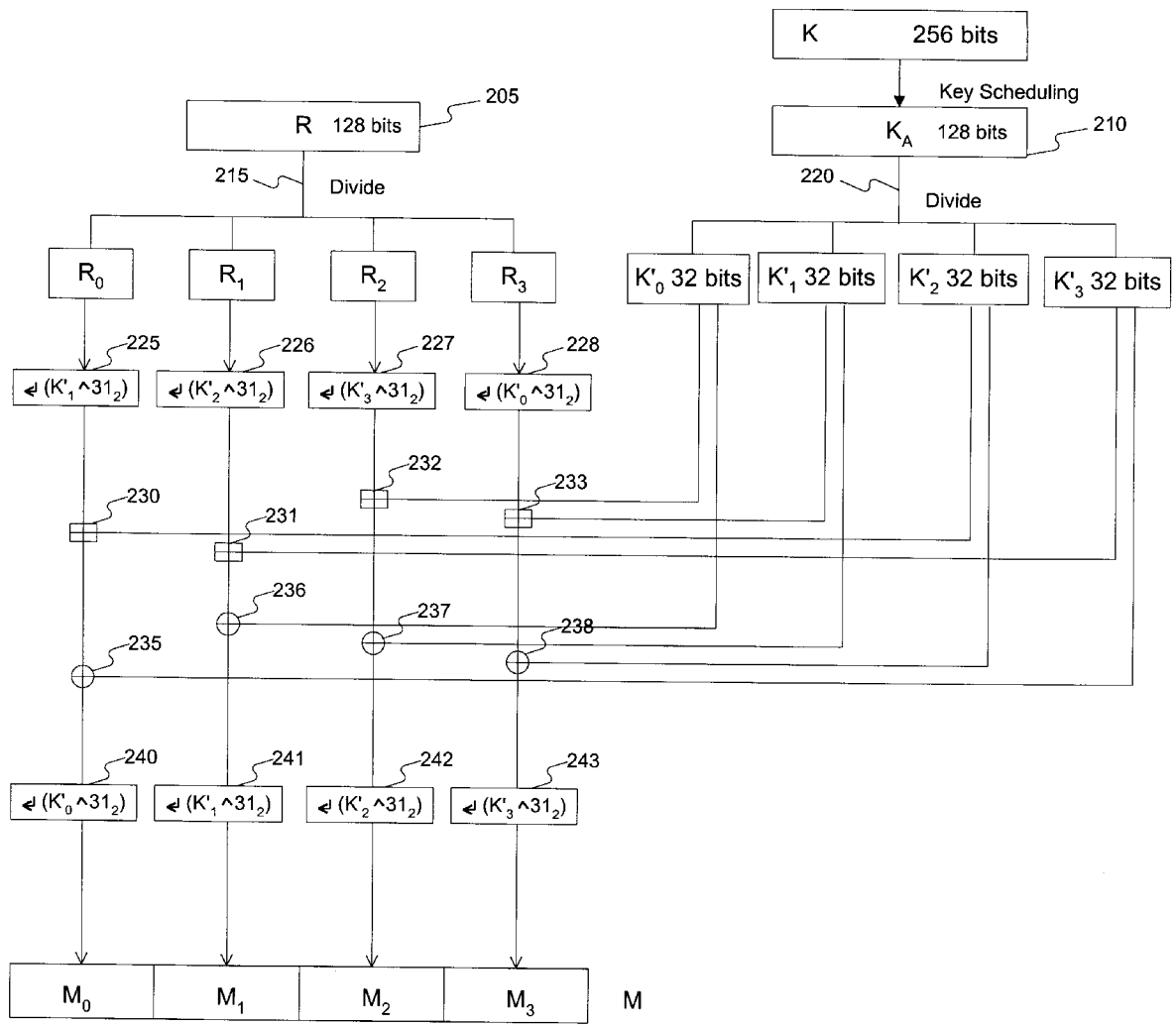
FIG. 2 is a flow diagram illustrating in detail a first step of the round function of the present invention.
Figure 3:
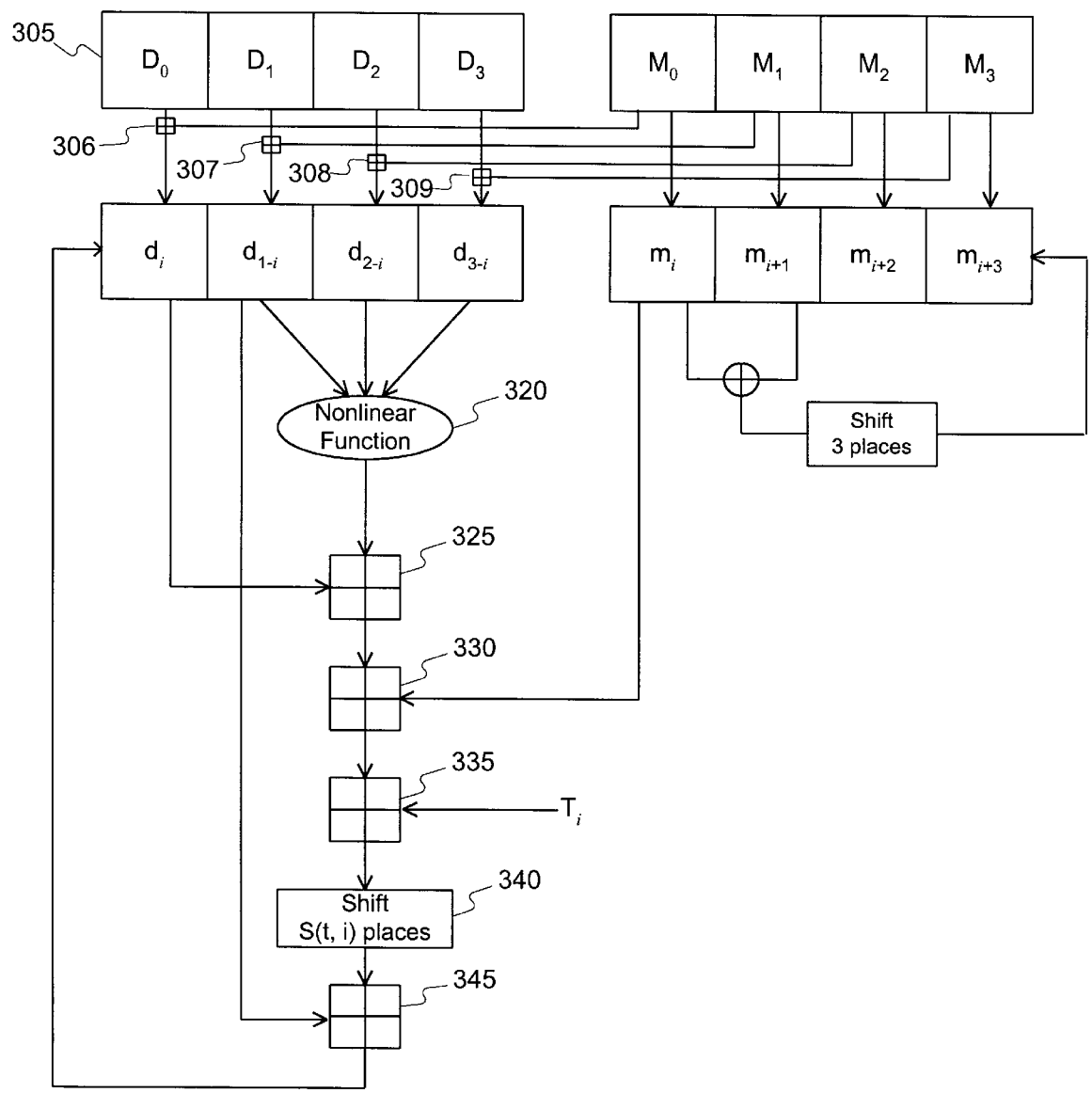
FIG. 3 is a flow diagram illustrating in detail a second step of the round function of the present invention.
Figure 4:
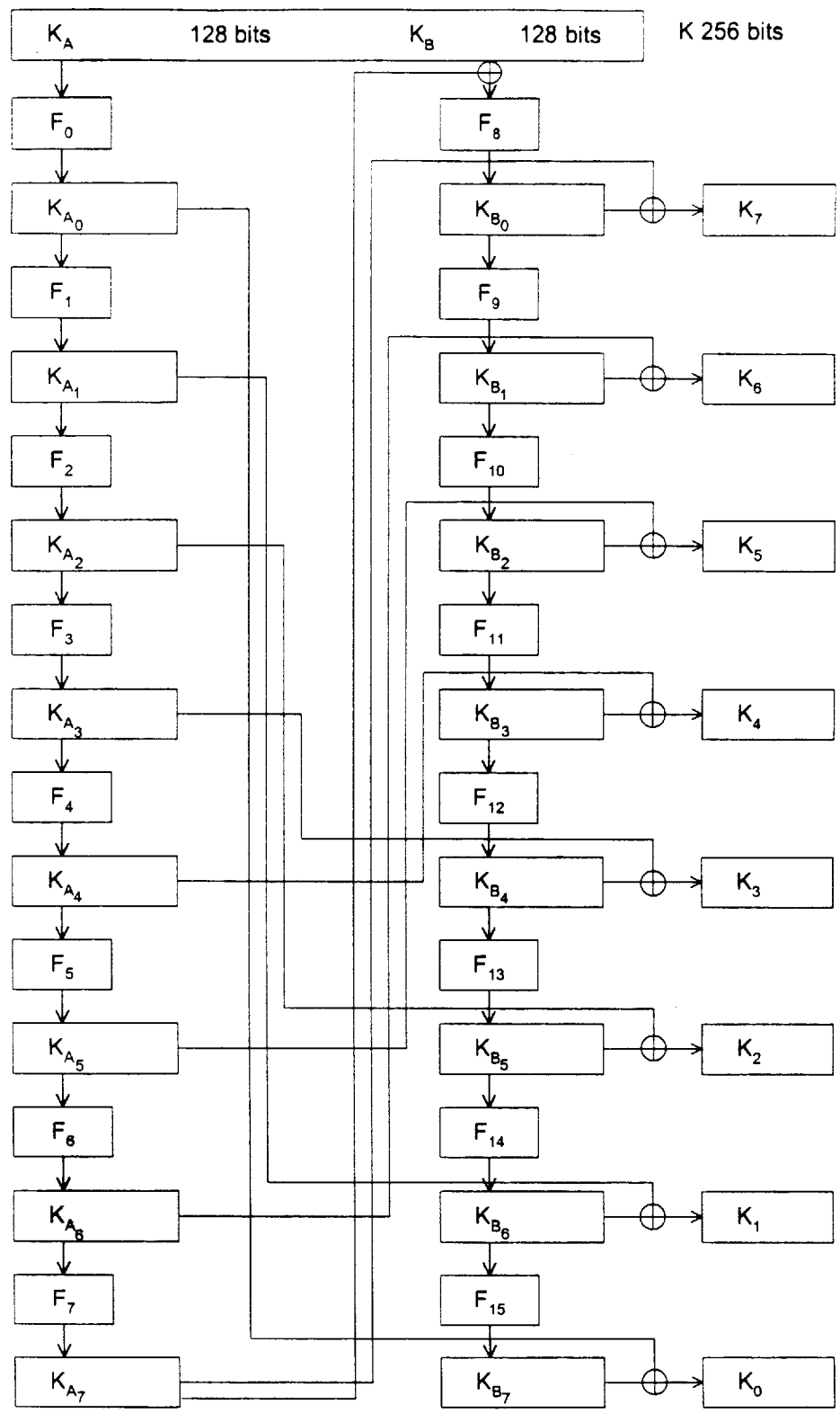
FIG. 4 is a flow diagram showing the key scheduling process.

A system consistent with the present invention is an 8-round Feistel cipher with a input block size and key size of 256 bits. The general structure shown in FIG. 1b resembles the Feistel cipher depicted in FIG. 1a with r=8. FIGS. 2 and 3 illustrate the various components of the round function. Details of the key generation process are illustrated in FIG. 4 and explained in more detail below.

The present invention may be designed as a Feistel network with seven or fewer rounds, i.e. r<8, however, a Feistel network with 8 or more rounds is highly recommended. Research has shown that the composition of two permutation generators that are less than perfectly secure creates a permutation generator that is more secure than either one alone. See M. Luby and C. Rackoff, "Pseudorandom permutation generator and cryptographic composition," in *Proceedings of the* 18*th Annual Symposium on Theory of Computing* (May 28–30, 1986). In the embodiment where r=8, for example, the first four rounds can be viewed as one super pseudorandom invertible permutation and the last four rounds can be viewed as another. The overall cipher is then equivalent to the composition of these two ciphers, which will compensate to some degree for any non-optimal security in the component ciphers due to the use of apparently secure, but not provably secure, round functions.

Systems consistent with the present invention also may use many different block and key sizes. Block size and key size of at least 256 bits each, however, is recommended to provide a wide safety margin against as yet unknown cryptanalytic attacks, particularly those in which the key bits must be recovered by some attacks before exhaustive search over the remaining bits becomes computationally feasible even within the foreseeable future. The large block size also allows the cipher to be used with a large number of inputs, so that this cipher may be appropriate even for environments in which many terabytes of data must be encrypted with a single key.

Referring again to FIG. 1b, an input message block of 256 bits is split into right half $R_0$ 165 and left half $L_0$ 160, each 128 bits long. In the first iteration of the round function, right half $R_0$ and key $K_0$ are input to function 175. The round function is a two-step modified hash function that accepts two fixed-size inputs, each of which is the size of the function output. In general, the first step masks the data with the subkey to produce a 128-bit data block. The second step substitutes this 128-bit data block with another pseudorandomly chosen 128-bit data block. The first step uses every 32-bit word of the subkey, with three different binary operations, to modify each 32-bit word of the data. This appears to be a much more effective masking operating than a simple XOR of the two input bit strings and helps to ensure that the input to the second step is not known if the subkey is not known. FIGS. 2 and 3 illustrate the function in greater detail.

A. The Round Function

FIG. 2 illustrates the first step of the round function. The function takes as input two 128-bit strings, right half R 205 and key $K_A$ 210. Right half R 205 is divided at 215 into four 32-bit words, $R_0$, $R_1$, $R_2$, and $R_3$. $R_0$, for example, represents the 32 most significant bits and $R_3$ represents the 32 least significant bits. In a similar manner, the 128-bit $K_A$ is divided at 220 into four 32-bit words, $K'_0$, $K'_1$, $K'_2$, $K'_3$. R is then combined with $K_A$ using various arithmetic and logical functions. In the following descriptions of the present invention, the symbols +, $\oplus$, $\vee$, $\wedge$, and $\neg$ represent addition modulo 32, bitwise XOR, bitwise OR, bitwise AND, and bitwise complement, respectively. FIG. 2 illustrates one embodiment of the present invention, that is, where R and $K_A$ are combined according to the following function:

for $i=0 \ldots 3$, $M_i = ((((R_i \leftarrow K'_{(i+1) \bmod 4}) + K'_{(i+2) \bmod 4}) \oplus K'_{(i+3) \bmod 4}) \leftarrow K'_{(i+4) \bmod 4})$ where $a \leftarrow b$ represents a circular left shift of the value in a by b bits.

To explain further, the four 32 bit words of R are shifted to the left by $K'_{(i+1)} \bmod 4$ number of bits at 225, 226, 227 and 228. $R_i$ is a 32-bit number so only the least significant 5 bits of $K'_{(i+1)} \bmod 4$ will be used for the rotation operation if $K'_{(i+1)} \bmod 4$ is greater than 5 bits in length. The result of the shifting operation is then combined with $K'_{(i+2)} \bmod 4$ at 230, 231, 232 and 233 using addition modulo 32. Each result is then bitwise XORed at 235, 236, 237 and 238 with $K'_{(i+3)} \bmod 4$. Lastly, each result is shifted to the left at 240, 241, 242 and 243 by the number of bits corresponding to the value in $K'_{(i+4)} \bmod 4$. The end result is four 32-bit intermediate values, $M_0$, $M_1$, $M_2$ and $M_3$ which will be used in the second step as the input vector.

The second step of the round function is illustrated in FIG. 3. As a first step of the mapping function of the present invention, each of the input vector values, $M_0$, $M_1$, $M_2$ and $M_3$, is added modulo 32 to the corresponding input constants $D_0$, $D_1$, $D_2$, and $D_3$ at 306, 307, 308 and 309. This step randomizes the starting point of the mapping operation without allowing the input to actually be the starting point. The input constants may be any 32-bit numbers, however, in the present example the input constants used are the following and are identical to the four constants used in the compression function of SHA-1.

$$D_0 = 2^{30}\sqrt{2} = 5a827999 \text{ (hex)}$$
$$D_1 = 2^{30}\sqrt{3} = 6ed9eba1 \text{ (hex)}$$
$$D_2 = 2^{30}\sqrt{5} = 8f1bbcdc \text{ (hex)}$$
$$D_3 = 2^{30}\sqrt{10} = ca62c1d6 \text{ (hex)}$$

Once the input vector M is modified by the input constants $D_i$, the result is used as the initializtion vector for the update function. The update function is defined arithmetically as follows:

For $i=0 \ldots 19$, do $$d_{(-i) \bmod 4} = (d_{(-i) \bmod 4} + f(i, d_{(1-i) \bmod 4}, d_{(2-i) \bmod 4}, d_{(3-i) \bmod 4}) + m_i + T_{(i+1) \bmod 4}) \leftarrow S(i, i \bmod 4)) + d_{(1-i) \bmod 4}$$

where $$f(t, x, y, z) = \begin{cases} (x \wedge y) \vee (\neg x \wedge z), & t = 0 \ldots 3 \\ (z \wedge x) \vee (\neg z \wedge y), & t = 4 \ldots 7 \\ (x \oplus y \oplus z), & t = 8 \ldots 11 \\ y \oplus (x \vee \neg z), & t = 12 \ldots 15 \\ z \oplus (y \vee \neg x), & t = 16 \ldots 19 \end{cases}$$

$$m_i = \begin{cases} M_i, & i = 0 \ldots 3 \\ ((m_{i-3} \oplus m_{i-4}) \leftarrow 3), & i = 4 \ldots 19 \end{cases}$$

$$T_i = \lfloor 2^{32} |\sin i| \rfloor$$

$$S(t, i) = \begin{cases} i=0 & i=1 & i=2 & i=3 \\ 7 & 12 & 17 & 22, & t = 0 \ldots 3 \\ 5 & 9 & 14 & 20, & t = 4 \ldots 7 \\ 4 & 11 & 16 & 23, & t = 8 \ldots 11 \\ 6 & 10 & 15 & 21, & t = 12 \ldots 15 \\ 3 & 8 & 13 & 19, & t = 16 \ldots 19 \end{cases}$$

In the present invention, the update function performs 20 iterations. In each iteration, three initialization values are inputted to a nonlinear function at 320. The result is added modulo 32 to the fourth initialization value at 325. Next, one 32-bit block derived from the input vector obtained from step one of the round function is added modulo 32 to the result at 330. For the first iteration, the $m_i$ are equal to the output from step one. For each successive iteration, the $m_i$ values are equal to an arithmetic or logical combination of two or more of the initial $m_i$, the result of which has been shifted a variable number of places. In the embodiment illustrated in FIG. 3, the assignment of values to the $m_i$ follows the SHA-1 design in that the $m_i$ are more than a simple permutation of the input words but, unlike SHA-1, each value depends on only 2 previous values (for faster operation) and a different shift value is used (3 bits instead of 1 bit).

The result is then modified by adding a constant, $T_i$, to the result at 335. The result is then shifted at 340 according to the shift values in the function $S(t,i)$, where t is the iteration. At 345, the result is modified by adding it modulo 32 to one of the inputs to the nonlinear function. This loop may be executed any number of times, however, excessive iterations will slow unnecessarily the execution time. Because the data string in the present invention is only 128 bits rather than 512 bits as in SHA-1, the present invention executes this loop only 20 times, which is conceptually similar but considerably faster than the 80 iterations performed in SHA-1. Upon completion of 20 iterations, the modified right half, or R', is comprised of the last four outputs of the update function, that is, for $i=0 \ldots 3$, $R'_i = d_i$.

Referring again to FIG. 1b, modified right half $R'_0$ is then XORed with left half $L_0$ 110 at 164. The result becomes the next input to the function, or $R_1$. $R_0$ then becomes $L_1$. Swapping the left and right halves completes round one. This process continues for eight rounds. Note that after the final round the left and right halves are not swapped, but instead are concatenated to form ciphertext 190.

The process for decrypting ciphertext 190 is essentially the encryption process in reverse order. Referring again to FIG. 1b and beginning at the bottom of the diagram, in the decryption process ciphertext message block 190 of 2n bits is split into a left half $L_8$ and right half $R_8$, $R_8$ and key $K_7$ are input to round function $f_7$, the output of which is used to modify left half $L_8$ and so on in reverse order of the encryption process described above. After eight iterations, the final left and right halves are concatenated to form original plaintext 155.

B. The Key Schedule

Figure 5:
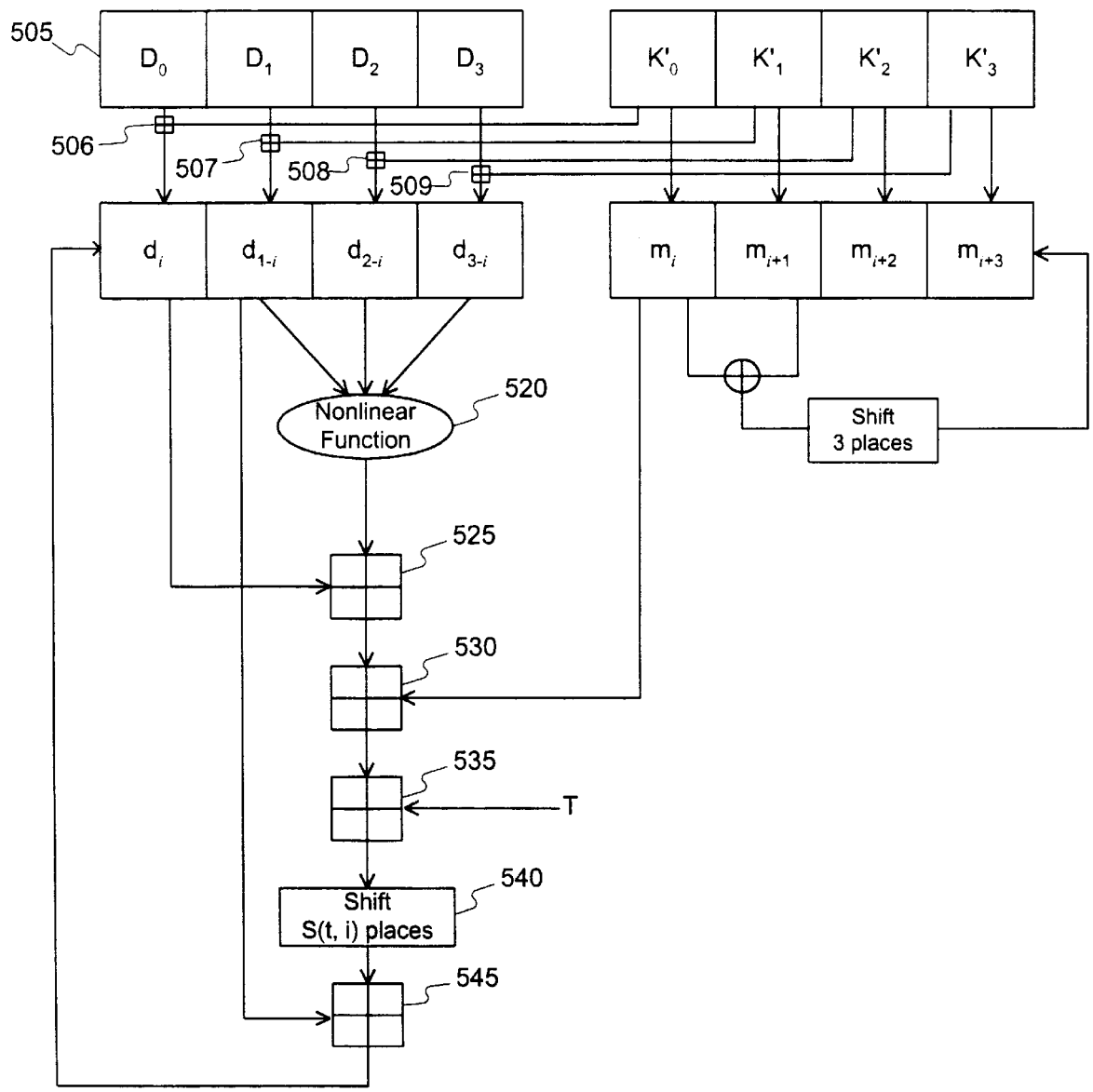
FIG. 5 is a flow diagram showing the mapping function of the key generation process.

The key schedule in the present invention takes a 256-bit input and creates eight 128-bit round keys using the mapping function as defined in the section above and as illustrated in FIG. 5. Referring now to FIG. 4, the first step in the key scheduling process is to split the input key into two halves $K_A$ (the most significant 128 bits) and $K_B$ (the least significant 128 bits). $K_A$ is then processed using mapping function, $F_O$.

As shown in FIG. 5, $K_A$ is divided into four 32-bit blocks. Each of the input constants $D_0$, $D_1$, $D_2$, $D_3$ is added modulo 32 to the corresponding key values, $K'_0$, $K'_1$, $K'_2$ and $K'_3$, at 506, 507, 508 and 509. The resulting values constitute the initialization values to the update function. In each iteration of the update function, three initialization values are combined according to a nonlinear function at 520. The result is added modulo 32 to one of the initialization values at 525. Next, one 32-bit block derived from the input vector obtained from step one of the round function is added modulo 32 to the result at 530. For the first iteration, the $m_i$ values are equal to the four output vector blocks from step one. For successive iterations, however, the $m_i$ values are equal to a arithmetic or logical combination of two or more of the initial $m_i$, the result which is then shifted a variable number of places. In the present invention, a shift value of three is preferred. The result is then modified by adding a constant, $T_i$, to the result at 535. The result is then shifted at 540 according to the shift values in the function S(t,i), where t is the iteration. At 545, the result is modified by adding it modulo 32 to one of the inputs to the nonlinear function. The present invention executes this loop 20 times.

Referring again to FIG. 4, the first output $K_{A_0}$ of the mapping function $F_0$ becomes the input to the mapping function $F_1$. Following the eighth execution of the mapping function, output $K_{A_0}$ is combined with $K_B$ and then used as input to $F_8$. As with the keys generated from $K_A$, the output $K_{B_0}$ of the mapping function $F_8$ becomes the input to the update function $F_9$ and so on. Following the sixteenth execution of the mapping function, the eight keys generated using $K_A$ are XORed with the eight keys generated using $K_B$ as shown in FIG. 4. This process produces eight 128-bit random-looking subkeys. In this context, "random-looking" means that any change in the initial 256-bit key results in a large, unpredictable change in every generated subkey. Also, partial or complete knowledge of any given set of subkeys provides no advantage in the computation of the remaining subkeys if the initial 256-bit key is unknown.

The key scheduling process may be mathematically defined as follows:

Let $K_{A_0}=F(K_A)$
  for i=1 . . . 7 $K_{A_i}=F(k_{A_{i-1}})$
Let $K_{B_0}=F(K_B \oplus K_{A_7})$
  for i=1 . . . 7 $K_{B_i}=F(K_{B_{i-1}})$
For i=0 . . . 7 $k_i = K_{A_i} \oplus K_{B_{7-i}}$ The key $k_i$ is then the string K given above in the description of the round function.

Figure 6:
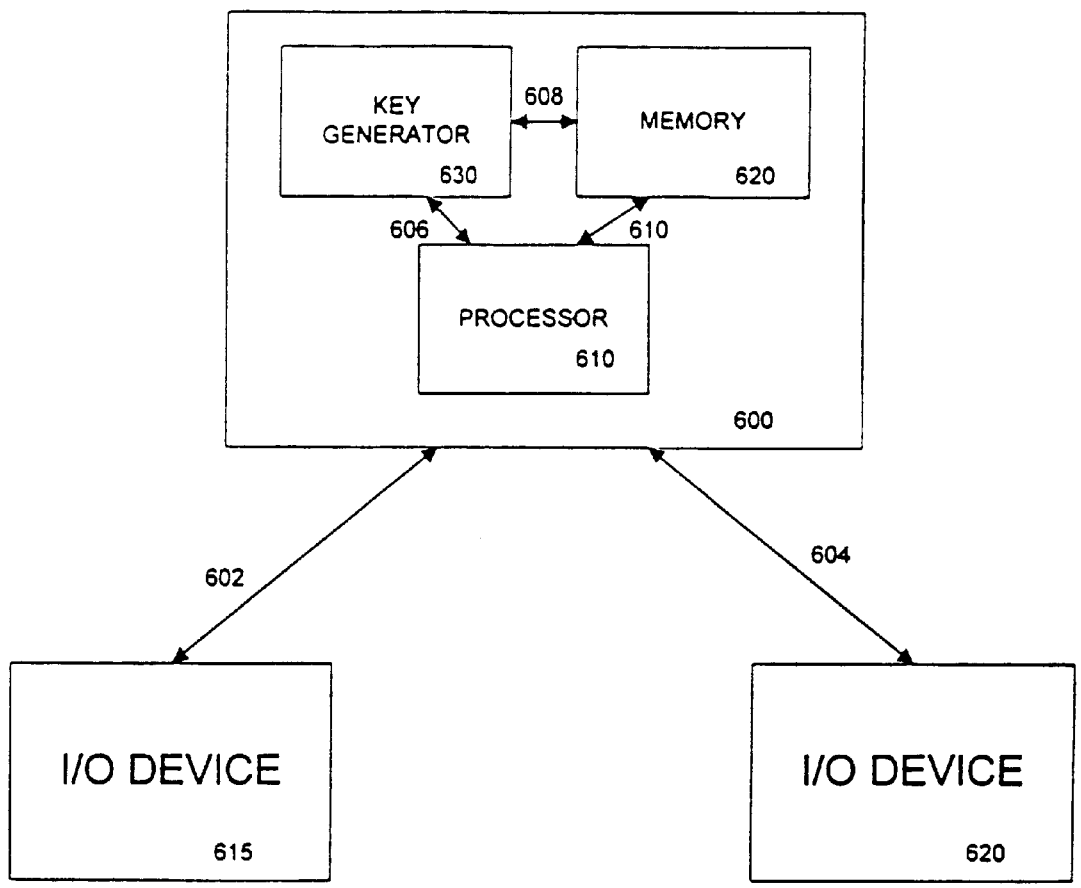
FIG. 6 shows a system for carrying out the method consistent with this invention.

FIG. 6 illustrates a system consistent with the present invention. As shown in FIG. 6, the present invention may be implemented using a personal computer (PC) 600 connected to one or more input/output (I/O) devices 615 and 620. Consistent with this invention, PC 600 may include a processor 610, key generator 630 and memory 620. Processor 610 may be any commonly available processor, however, faster speed processors will decrease the execution time of the invention. Key generator 630 may be implemented in software form on processor 610 or, for example, may be a separate hardware device that is capable of providing keys to the processor. Processor 610, memory 620 and key generator 630 are connected via data links 606, 608 and 610.

I/O devices 615 and 620 access PC 600 via data links 602 and 604. In general, I/O devices 615 and 620 can be any devices that are capable of passing information to or receiving data from processor 610. By way of example only, I/O devices 615 and 620 may be monitors, keyboards, modems, printers, display devices or workstations. Each workstation can be a PC or other hardware that includes a visual display device and data entry device such as a keyboard or mouse. It should be further understood that FIG. 6 describes an exemplary network where each of the hardware components may be implemented by conventional, commercially available computer systems.

It will be apparent to those skilled in the art that various modifications and variations can be made in the methods and systems consistent with the present invention without departing from the spirit or scope of the invention. The true scope of the claims is defined by the following claims.

What is claimed is:

1. A method of automatically transforming an input message block of binary data of predetermined length 2n into an output message block, where n is a positive integer, comprising steps of:

dividing the message block into a first and a second half data block of equal length;

processing the message block by one or more transformation rounds, each transformation round further comprising the steps of:
     determining a key;
     processing the first half data block using a hash function to obtain a modified first half data block of length n;
     combining the modified first half data block with the second half data block to obtain a modified second half data block of length n; and
     appending the modified first half data block to the modified second half data block to obtain the output message block.

2. The method according to claim 1, wherein the step of processing the first half data block using a hash function, further includes the steps of:

combining the key with the first half data block to obtain an intermediate data block; and processing the intermediate data block to obtain a modified first half data block of length n.

3. The method according to claim 2, wherein the step of processing the intermediate data block further includes the step of substituting the intermediate data block with a pseudorandomly chosen block of binary data of length n.

4. The method according to claim 2, wherein the step of processing the intermediate data block further comprises the steps of:

dividing the intermediate data block into k smaller data blocks of equal length, wherein k is a positive integer greater than one;

initializing a first k temporary variables $d_i$ to constants, for i=0 . . . k−1;

performing the following determination:

$$d_{(-i)} \bmod k = (d_{(-i)} \bmod k + f(i, d_{(1-i)} \bmod k, d_{(2-i)} \bmod k, d_{(3-i)} \bmod k) + m_i + T_{(i+1)}) \leftarrow S(i, i \bmod 4)) + d_{1-i} \bmod k$$

where i is a positive integer greater than 1 and i equals the number of iterations minus one; and concatenating the last k temporary variables to obtain the modified first half data block of length n.

5. The method according to claim 4, further including the step of combining the temporary variables with the intermediate data block using an arithmetic/logical function.

6. The method according to claim 2, wherein the step of combining the key with the first half data block further comprises the steps of:

dividing the key into k pieces of equal length, where k is a positive integer greater than 1;

dividing the first half data block into k pieces of equal length;

combining the k pieces of the key with the k pieces of the first half data block using an arithmetic/logical function to obtain k pieces of intermediate data; and concatenating the k pieces of intermediate data to form one intermediate data block of length n.

7. The method according to claim 2, wherein the step of combining the key with the first half data block further comprises the steps of:

dividing the key, K, into four pieces of equal length;

dividing the first half data block, R, into four pieces of equal length; and combining the four pieces of the key with the four pieces of the first half data block to obtain four pieces of an intermediate data block, M, according to the following:

for $i=0 \ldots 3$, $M_i((((R_i \leftarrow K_{(i+1)} mod\ 4) + K_{(i+2)} mod\ 4) \oplus K_{(i+3)} mod\ 4) \leftarrow K_{(i+4)} mod\ 4)$.

8. The method according to claim 2, wherein the step of processing the intermediate data block further includes the steps of:

dividing the intermediate data block into two smaller data blocks of equal length;

performing a nonlinear function on a subset of the smaller data blocks to obtain a result;

generating a temporary data block from the intermediate data block;

combining the result and the temporary data block with one of the remaining smaller data blocks and a constant to obtain a second result;

shifting the second result a variable number of places; and combining one or more of the smaller data blocks and the second result to obtain the modified first half data block of length n.

9. The method according to claim 8, wherein the step of combining further comprises the step of using an arithmetic/logical function.

10. The method according to claim 8, further including the step of combining each smaller data block with a constant using an arithmetic/logical function.

11. The method according to claim 8, wherein the step of performing a nonlinear function further includes the step of:

combining the smaller data blocks using the function, f(t, x, y, z), where f is the mapping $f:\{0,1\}^n \rightarrow \{0,1\}^n$ and f may be further defined as:

$$f(t, x, y, z) = \begin{cases} (x \wedge y) \vee (\neg x \wedge z), & t = 0 \ldots 3 \\ (z \wedge x) \vee (\neg z \wedge y), & t = 4 \ldots 7 \\ (x \oplus y \oplus z), & t = 8 \ldots 11 \\ y \oplus (x \vee \neg z), & t = 12 \ldots 15 \\ z \oplus (y \vee \neg x), & t = 16 \ldots 19 \end{cases}$$

where x, y, and z are the smaller data blocks and t is a positive integer less than 20 indicating the number of the current iteration.

12. The method according to claim 8, wherein the step of shifting the second result a variable number of places further includes the step of:

shifting the second result S(t,i) places wherein for the tth iteration, i=t mod 4 and $$S(t, i) = \begin{cases} i=0 & i=1 & i=2 & i=3 & \\ 7 & 12 & 17 & 22, & t = 0 \ldots 3 \\ 5 & 9 & 14 & 20, & t = 4 \ldots 7 \\ 4 & 11 & 16 & 23, & t = 8 \ldots 11 \\ 6 & 10 & 15 & 21, & t = 12 \ldots 15 \\ 3 & 8 & 13 & 19, & t = 16 \ldots 19 \end{cases}$$

13. The method according to claim 8, wherein the constant for iteration i is $T_i$, wherein $T_i = \lfloor 2^{32} | \sin i | \rfloor$, for $i=0 \ldots 19$.

14. The method according to claim 8, wherein the step of generating the temporary data block, further includes the steps of:

combining the smaller data blocks of the intermediate data block to obtain an outcome; and shifting the outcome a variable degree of places to generate the temporary data block.

15. The method according to claim 8, wherein the step of generating the temporary data block, further includes the step of generating the temporary data block for the ith iteration, $m_i$, according to the following:

for $i = 0 \ldots 19$ $$m_i = \begin{cases} M_i, & i = 0 \ldots 3 \\ ((m_{i-3} \oplus m_{i-4}) \lll 3), & i = 4 \ldots 19 \end{cases}$$

wherein $M_i$ is the ith section of the intermediate data block, M.

16. The method according to claim 1, wherein n is one of either 128, 160 or 192.

17. The method according to claim 1, wherein the step of determining a key further includes the step of generating two or more round keys from an original key of length 2n.

18. The method according to claim 17, wherein the step of generating two or more round keys further includes the steps of:

dividing the original key into a first key and a second key of equal length;

processing the first key using a hash function to obtain a first set of intermediate keys; and processing the second key using a hash function to obtain a second set of intermediate keys.

19. The method according to claim 18, wherein the step of generating round keys further includes the step of:

combining the first and second sets of intermediate keys to obtain a set of round keys, and the step of combining further comprises the substep of involving an arithmetic/logical function.

20. A data encryption system for transforming an input message block of binary data of predetermined length 2n into an output message block, where n is a positive integer, comprising:

a divider for dividing the message block into a first and a second half data block of equal length;

a key generator;

a hashing processor for processing the first half data block using a hash function to obtain a modified first half data block of length n;

a data processor for combining the modified first half data block with the second half data block to obtain a modified second half data block of length n; and a concatenator for appending the modified first half data block to the modified second half data block to obtain an output message block.

21. The system according to claim 20, wherein the hashing processor, further includes:
   a data processor for combining the key with the first half data block to obtain an intermediate data block; and
   a transformer for processing the intermediate data block to obtain a modified first half data block of length n.

22. The system according to claim 21, wherein the transformer further includes a pseudorandom data generator for substituting the intermediate data block with a pseudorandomly chosen block of binary data of length n.

23. The system according to claim 21, wherein the transformer further comprises:
   a block separator for dividing the intermediate data block into k smaller data blocks of equal length, wherein k is a positive integer greater than one;
   a first data processor for initializing a first k temporary variables, $d_i$, to constants, for i=0 . . . k−1;
   a second data processor for performing the following determination:

$$d_{(-i) \bmod k} = (d_{(-i) \bmod k} + f(i, d_{(1-i) \bmod k}, d_{(2-i) \bmod k}, d_{(3-i) \bmod k}) + m_i + T_{(i+1)}) \leftarrow S(i, i \bmod 4)) + d_{1-i} \bmod k$$

where i is a positive integer greater than 1 and i equals a number of iterations minus one; and
   a concatenator for concatenating the last k temporary variables to obtain a modified first half data block of length n.

24. The system according to claim 23, further comprising a third data processor for modifying the temporary variables by combining them with the intermediate data block using an arithmetic/logical function.

25. The system according to claim 21, wherein the data processor for combining the key with the first half data block further comprises:
   a key separator for dividing the key into k pieces of equal length, k a positive integer greater than 1;
   a data separator for dividing the first half data block into k pieces of equal length;
   a processor for combining the k pieces of the key with the k pieces of the first half data block using an arithmetic/logical function to obtain k pieces of intermediate data; and
   a concatenator for concatenating the k pieces of intermediate data to form one intermediate data block of length n.

26. The system according to claim 21, wherein the data processor for combining the key with the first half data block further comprises:
   a key separator for dividing the key, K, into four pieces of equal length;
   a data separator for dividing the first half data block, R, into four pieces of equal length; and
   a processor for combining the four pieces of the key with the four pieces of the first half data block to obtain four pieces of an intermediate data block, M, according to the following:

for i=0 . . . 3, $M_i = ((((R_i \leftarrow K_{(i+1) \bmod 4}) + K_{(i+2) \bmod 4}) \oplus K_{(i+3) \bmod 4}) \leftarrow K_{(i+4) \bmod 4})$.

27. The system according to claim 21, wherein the transformer further includes:

a block separator for dividing the intermediate data block into smaller data blocks of equal length;
   a first data processor for performing a nonlinear function on a subset of the smaller data blocks to obtain a result;
   a temporary data block generator for generating a temporary data block from the intermediate data block;
   a second data processor for combining the result and the temporary data block with one of the remaining smaller data blocks and a constant to obtain a second result;
   a shift register for shifting the second result a variable number of places; and
   a third data processor for combining one of the smaller data blocks and the second result to obtain a modified first half data block of length n.

28. The system according to claim 27, wherein the second data processor further comprises arithmetic/logical gates.

29. The system according to claim 27, further comprising a fourth data processor for modifying each of the smaller data blocks by combining each smaller data block with a constant using an arithmetic/logical function.

30. The system according to claim 27, wherein the first data processor further comprises:
   a plurality of gates for combining the smaller data blocks using the function, f(t, x, y, z), where f is the mapping $f: \{0,1\}^n \rightarrow \{0,1\}^n$ and f may be further defined as:

$$f(t, x, y, z) = \begin{cases} (x \wedge y) \vee (\neg x \wedge z), & t = 0 \ldots 3 \\ (z \wedge x) \vee (\neg z \wedge y), & t = 4 \ldots 7 \\ (x \oplus y \oplus z), & t = 8 \ldots 11 \\ y \oplus (x \vee \neg z), & t = 12 \ldots 15 \\ z \oplus (y \vee \neg x), & t = 16 \ldots 19 \end{cases}$$

where x, y, and z are the smaller data blocks and t is a positive integer less than 20 indicating the number of the current iteration.

31. The system according to claim 27, wherein the shift register further comprises:
   a means for shifting the second result S(t,i) places wherein for the tth iteration, $i = t \bmod 4$ and $$S(t, i) = \begin{cases} \begin{array}{cccc} i=0 & i=1 & i=2 & i=3 \\ 7 & 12 & 17 & 22, \end{array} & t = 0 \ldots 3 \\ \begin{array}{cccc} 5 & 9 & 14 & 20, \end{array} & t = 4 \ldots 7 \\ \begin{array}{cccc} 4 & 11 & 16 & 23, \end{array} & t = 8 \ldots 11 \\ \begin{array}{cccc} 6 & 10 & 15 & 21, \end{array} & t = 12 \ldots 15 \\ \begin{array}{cccc} 3 & 8 & 13 & 19, \end{array} & t = 16 \ldots 19 \end{cases}$$

32. The system according to claim 27, wherein the constant for iteration i is $T_i$, wherein $T_i = \lfloor 2^{32} | \sin i | \rfloor$, for i=0 . . . 19.

33. The system according to claim 27, wherein the temporary data block generator further includes:
   a processor for combining two of the smaller data blocks of the intermediate data block to obtain an outcome; and
   a shift register for shifting the outcome a variable degree of places to generate a temporary data block.

34. The system according to claim 27, wherein the temporary data block generator further comprises a processor for generating the temporary data block for the ith iteration, $m_i$, according to the following:

$$\text{for } i = 0 \ldots 19$$
$$m_i = \begin{cases} M_i, & i = 0 \ldots 3 \\ ((m_{i-3} \oplus m_{i-4}) \lll 3), & i = 4 \ldots 19 \end{cases}$$

wherein $M_i$ is the ith section of the intermediate data block, M.

35. The system according to claim 20, wherein n is one of either 128, 160 or 192.

36. The system according to claim 20, wherein the key generator further comprises a key processor for generating two or more round keys from an original key of length 2n.

37. The system according to claim 36, wherein the key processor further comprises:
   a key separator for dividing the original key into a first key and a second key of equal length;
   a first hashing processor for processing the first key using a hash function to obtain a first set of two or more intermediate keys; and
   a second hashing processor for processing the second key using a hash function to obtain a second set of two or more intermediate keys.

38. The system according to claim 37 further comprising a processor for combining the first and second sets of intermediate keys to obtain a set of two or more round keys, wherein the processor for combining further comprises one or more gates performing arithmetic/logical functions.

* * * * *